Patented Oct. 31, 1939

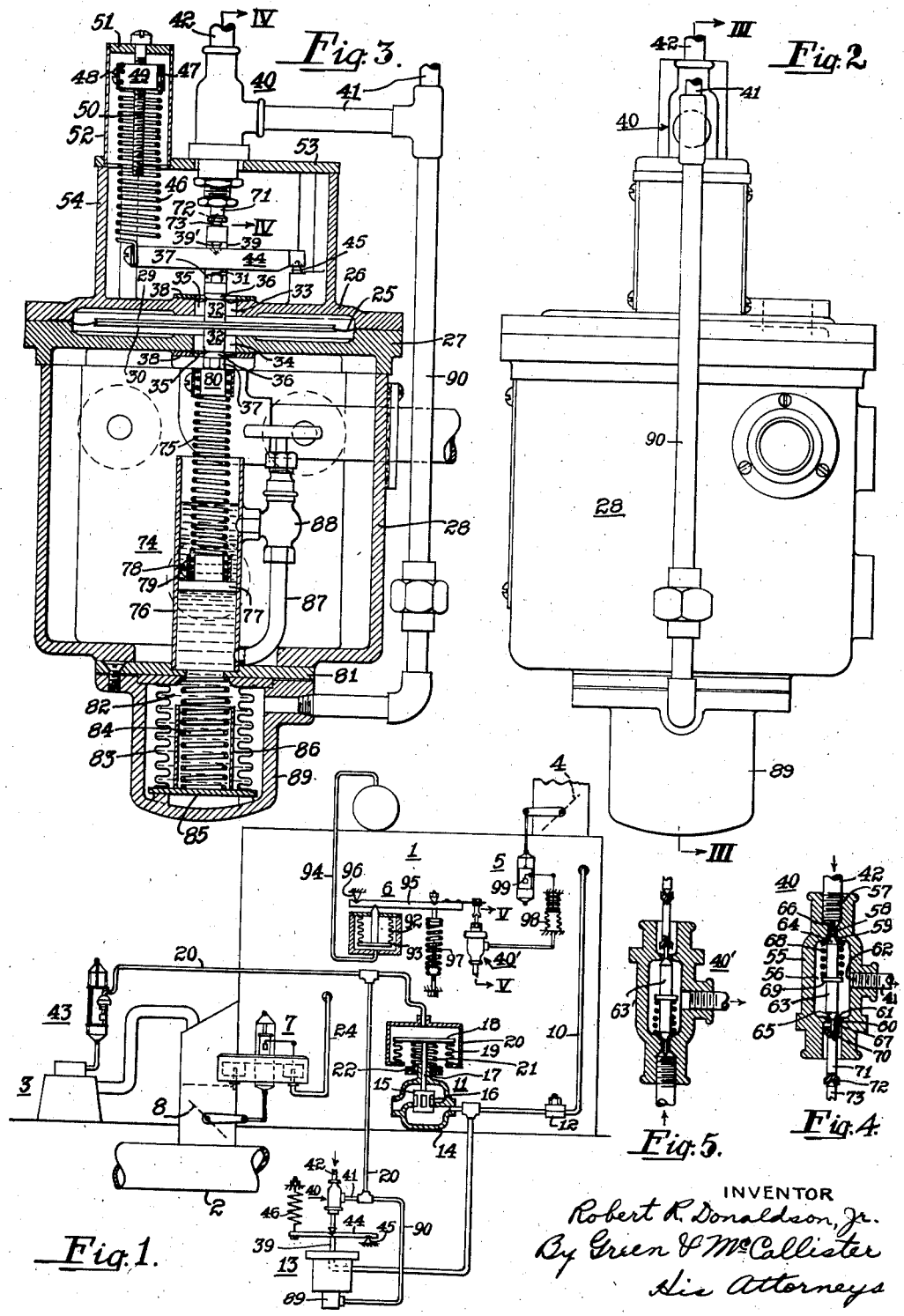

2,177,823

UNITED STATES PATENT OFFICE 2,177,823

REGULATING SYSTEM

Robert R. Donaldson, Jr., Pittsburgh, Pa., assignor to John M. Hopwood, Dormont, Pa.

Application May 31, 1935, Serial No. 24,222

3 Claims. (Cl. 236—15)

This invention relates to regulating apparatus and more particularly to systems for maintaining a predetermined relationship between one variable quantity, such as the rate of air supply to a furnace, and another quantity, for example the fuel supply.

An object of this invention is the provision of a regulating system which will function to maintain a predetermined relationship or proportion between the rate of flow of one quantity, such as air, and another quantity, such as fuel, and whereby the rate of flow of one of these quantities may be utilized as a measure of the rate of delivery of the other quantity.

Other objects of the invention will in part be apparent, and will in part, be obvious from the following description taken in conjunction with the accompanying drawing, in which:

Figure 1 is a more or less diagrammatic view of a boiler furnace and a control system embodying one form of the invention, and which is arranged to maintain a proper relationship between the draft and the rate of supply of fuel and air for any value of load or rating at which the boiler may be working;

Fig. 2 is a view in side elevation of a regulating device embodied in the system of Fig. 1;

Fig. 3 is a view in section taken on line III—III of Fig. 2;

Fig. 4 is a view in section of a part of the device shown in Figs. 2 and 3 taken on line IV—IV of Fig. 3; and Fig. 5 is a view in section of a device similar to the one shown in Fig. 4 but taken on line V—V of Fig. 1.

Throughout the drawing and the specification, like reference characters indicate like parts.

In Fig. 1 of the drawing is illustrated a boiler furnace 1 having a combustion air supply conduit 2, means 3 for supplying fuel, such as pulverized coal, thereto, an outlet damper 4 operated by a regulator 5, a load responsive device 6 for so controlling regulator 5 that the draft across the boiler will be varied by and in accordance with the load demand, and a regulator 7 for adjusting the air supply in accordance with the draft, and therefore in accordance with the load. Regulator 5 may be of any well known type such as, for example, the damper adjusting regulator or motor shown in United States Patent No. 1,931,906.

The invention as illustrated in the embodiment of Fig. 1 is arranged to respond to a primary variable, such as steam pressure and to regulate and maintain a predetermined relationship between the rates of air and fuel supply to the furnace so that sufficient combustion conditions will result for all conditions of the primary variable. In accordance with the invention the rate at which air is delivered to the furnace, for all values of draft, is measured and the rate of fuel supply is then regulated to properly correspond to the rate of air supply.

The air for combustion may be supplied, for example, by a forced draft fan, not shown, connected to conduit 2, at any suitable pressure. When outlet damper 4 is open or moved towards open position in response to an increase in load on the boiler, the pressure in the combustion chamber will decrease unless the rate of air supply is increased. If outlet damper 4 is moved towards closed position in response to a decrease in the boiler load demand, the pressure in the combustion chamber rises unless the rate of air supply is decreased. These changes in combustion chamber pressure act on regulator 7 which is shown to be of the balanced float type such as shown in United States Reissued Patent No. 18,479 under date of May 24, 1932, and which operates a damper 8 in air supply conduit 2. If this regulator is adjusted to maintain a given pressure in the combustion chamber, say atmospheric pressure, then damper 8 will be so adjusted that the air supply will be throttled or regulated to maintain a constant pressure in the combustion chamber. When the furnace chamber pressure increases, regulator 7 shifts damper 8 towards closed position to decrease the air supply until the chamber pressure is restored to the proper value. If the chamber pressure is decreasing, damper 8 is opened to increase the air supply until the chamber pressure is restored to the proper value.

Since the air supply is regulated to maintain a constant pressure in the combustion chamber, it follows that the draft loss, i. e., pressure drop from the combustion chamber through the boiler passes to the furnace outlet will be a measure or function of the rate of air supply to the boiler, and also a measure of the gas weight passing through the boiler passes, assuming that the boiler passes are kept clean or at least at the same degree of cleanliness at all times.

In accordance with this invention, the pressure drop across the boiler or the gas weight passing therethrough is simulated or reproduced in miniature and variations in pressure drop are utilized to develop control impulses which in magnitude, bear a definite relationship to gas weight and therefore to the rate of air supply. These control impulses are utilized to regulate some other quantity, say the delivery of fuel, so that the fuel and air will be delivered to the furnace in the proper proportions, one to the other. To reproduce in miniature, the rate of supply of air to the furnace, a conduit 10 is provided and connected at one end to the outlet of the furnace on the suction or low side of the outlet damper 4. The other end of this conduit is connected to a valve 11, the inlet of which is open to the atmosphere. A fixed but adjustable orifice 12 is connected in pipe 10 between the suction end thereof and valve 11. The length and size of pipe 10 is made such that there is no appreciable pressure drop through it except through valve 11 and orifice 12. Thus, for any setting or degree of opening in valve 11, the flow of air through it will vary by and in accordance with the draft at the furnace outlet as fixed by the position of the outlet damper 4. For every change in draft however, there will be a different value of pressure drop through valve 11 and orifice 12, and therefore a different but definite value of suction between them. These changes in suction are utilized to actuate a regulating device 13 which operates valve 11 in such fashion that a substantially constant pressure drop is maintained across it to thereby maintain a substantially constant value of suction in that portion of pipe 10 between this valve and orifice 12.

Device 13 is balanced to maintain a predetermined value of pressure differential across valve 11 and when this value changes, device 13 responds and sends out a control impulse whose magnitude is a function of the pressure drop across valve 11 (and therefore, a function of the rate of air flow through it and therefore a function of the rate of air supply to the furnace). This control impulse is utilized to operate valve 11 as aforesaid, and to control the rate of fuel supply, or any other desired quantity, in accordance with the rate of supply of air.

Valve 11 comprises a valve body 14 having a valve plug 15 which is provided with a series of circumferentially spaced ports 16 through which air flows from the atmosphere into line 10. These ports are preferably so shaped that the rate of flow through the valve will be substantially a linear function of the area of opening and which in turn is a linear function of the position of the valve. Valve plug 15 has a stem 17 which is connected to a thrust plate 18 secured to a bellows 19 mounted in a pressure tight casing 20 to which the pressure impulses sent out by device 13 are transmitted. A compression spring 21 is supported between thrust plate 18 and a seat 22 and yieldingly opposes downward movement of the thrust plate and the valve plug when increasing pressures are delivered by device 13 to the casing.

Since the flow of air through valve 11 is a turbulent flow and results in a pressure drop, and since the flow through a boiler furnace and its passes is also a turbulent flow, the drop across valve 11 will be substantially an accurate measure of the rate of supply of air to the furnace, and particularly so where the furnace combustion chamber pressure and the pressure at the inlet of valve 11 are equal to atmospheric pressure. If the combustion chamber pressure is maintained at any other value, the flow through valve 11 may be made to correspond to the rate of flow of air to the combustion chamber by connecting the inlet of the valve to the interior of the combustion chamber, as at the point where the balanced float regulator 7 is connected by pipe 24 thereto.

Fixed orifice 12 is utilized to develop such a pressure drop that the pressure (suction) to which device 13 responds need be only a fractional part of the maximum suction at the furnace outlet.

Device 13 may be of any suitable construction which is sensitive enough to respond to minute changes in pressure, such as occur between valve 11 and orifice 12, and which can send out control impulses that vary by and in accordance with these minute changes in pressure. A device suitable for this purpose is illustrated more or less in detail in Fig. 3. This device comprises a flexible diaphragm 25 the outer edges of which are clamped between housing parts 26 and 27 which are bolted or otherwise positively secured together to form a pressure tight casing. These parts are supported on a frame 28. The inner portion of diaphragm 25 is backed on both sides with backing plates 29 and 30 which are clamped tightly to the diaphragm by means of a through bolt 31 and sleeves 32 threaded thereon. Bolt 31 extends through openings 33 and 34 in the parts 26 and 27 of the diaphragm casing and these openings are sealed by means of flexible diaphragms 35 through which the bolt passes. A tight joint is maintained at the point where the bolt passes through these diaphragms by means of washers 36 which are drawn up tightly on the diaphragm by means of nuts 37. The outer edges of diaphragms 35 are clamped tightly to the parts 26 and 27 by means of clamping rings 38 which are secured to these parts in any appropriate or suitable manner. The upper end of bolt 31 is connected by a link 39 to an escapement valve 40 which controls the magnitude of pressure of a motive fluid such as compressed air which is delivered to a sending line 41 from a supply line 42. The sending line is connected to the bellows casing 20 of valve 11 and to a regulator 43 such as shown in my application Serial No. 689,745, filed Sept. 16, 1933 and assigned to John M. Hopwood.

Regulator 43 controls the fuel supply means 3. A lever 44 which is fulcrumed at one end on a knife edge 45 and which bears against a knife edge 39' carried by link 39 is yieldingly supported at its other end by a tension spring 46 which is adjusted to support or balance the weight of the parts connected to diaphragm 25 including parts of valve 40 as will later appear herein.

The upper end of spring 46 is secured with a clamping ring 47 and screw 48 to a block 49 which in turn is supported on a screw 50 by means of which the block may be raised or lowered to increase or decrease the tension in the spring. Screw 50 extends through a plate 51 carried at the upper end of a tubular support and housing 52, the latter being secured to a plate 53 which forms the cover of a housing 54 that extends upwardly from the diaphragm housing 26.

Escapement valve 40, which is shown in detail in Fig. 4, comprises a body 55 having a chamber 56 therein which is provided at one end with an inlet 57 to which pipe 42 is connected and that communicates with the body chamber 56 through a restricted opening 58 having a tapered seat 59. The other end of chamber 56 has a restricted opening 60 which forms the exhaust port and the inner end of this opening has a tapered seat 61. The valve body has an outlet 62 to which the sending line 41 is connected.

A valve 63 is positioned within valve chamber 56 and is provided with tapered surfaces 64 and 65 adapted to cooperate with seats 59 and 61, respectively, to control the magnitude of the pressure at which the control impulses are transmitted from supply line 42 to the sending line 41. Valve 63 is provided at each end with relatively slender extensions 66 and 67 that extend through openings 58 and 60 and guide the valve in its movement. A compression spring 68 which surrounds valve 63 and is retained between the upper end of valve chamber 56 and a flange 69 on the valve, urges the valve towards the position in which it is seated on the exhaust port 61. The lower extension rests in a socket 70 at the end of a link 71 which connect' valve 63 to link 39. The lower end of link 71 has a socket 72 in which is seated a tapered lug 73 carried by link 39. As diaphragm 25 raises and lowers, valve 63 is raised and lowered to vary the pressure in the sending line 41. When the valve 63 is seated on the exhaust port seat 61, there is no leakage to the atmosphere so that pressure in the sending line will build up to a value equal to the pressure in the supply line 42. If valve 63 is seated on seat 59, the exhaust port is wide open so that the pressure in the sending line and in the valve chamber 56 will leak off and decrease to atmospheric value. When the valve 63 is in other positions, so that the inlet and exhaust ports are both uncovered, the pressure in the sending line will vary in minute steps and may assume any value between the maximum and minimum values above noted, depending upon the relative throttling effects which take place at the inlet and exhaust ports.

When valve 63 is midway between seats 59 and 61, it can be assumed that the pressure delivered to chamber 20 of valve 11 and to regulator 43 correspond to half boiler rating and that when the valve inlet port is wide open, the boiler is operating at minimum rating, and that when the exhaust port is wide open, the boiler is operating at maximum rating. For all these values of rating, the suction acting on diaphragm 25 will be substantially constant and that the variation in suction between minimum and maximum may be as small as 0.001 inch of water.

As stated previously herein, device 13 need not be of any special construction so long as it will perform the functions desired. It is desirable however, that device 13 should be anti-hunting in character so that the adjustments in the rates of supply of fuel and air will be in the proper relation one to the other for any particular value of boiler load or rating. To render device 13 anti-hunting, a dashpot 74 is provided which is actuated by and in accordance with the pressure impulses delivered to sending line 41. The dashpot is yieldingly connected by a spring 75 to diaphragm 25 and always acts to urge the diaphragm towards its neutral position, i. e., to the position from which the diaphragm was moved in response to a change in pressure conditions, i. e., suction, between valve 11 and orifice 12, caused, for example, by a change in position of the outlet damper. Device 13 operates to adjust valve 11 and maintain the suction between valve 11 and orifice 12 substantially constant, so that for all practical purposes, diaphragm 25 has one normal position to which position the dashpot tends to urge it whenever a change in operating conditions cause the diaphragm to move. The range of pressure variation to which diaphragm 25 of device 13 responds is very small and may, in some cases, as stated above, be only 0.001 inch of water, although the pressure impulses sent out by valve 40 thereof may vary over a wide range of pressures measured in pounds per square inch. Therefore, for all practical purposes, it may be said that the pressures to which diaphragm 25 responds, i. e. the pressure between valve 11 and orifice 12, are substantially constant in value compared to the pressures sent out by valve 40, or to the pressure variations in the furnace uptake or outlet.

Dashpot 74 comprises a cylinder 76 having a piston 77 therein which is secured to the lower end of spring 75 by means of a clamping ring 78 and a screw 79. The upper end of this spring is anchored to a block 80 which is carried by the lower end of bolt 31. The lower end of cylinder 76 is secured to a plate 81 having an opening therein which communicates with a displacement chamber 82 formed by a bellows 83. This bellows is urged towards its maximum volumetric capacity by means of a compression spring 84 which is interposed between plate 81 and a thrust plate 85 secured to the end of the bellows. This spring operates within a tubular guide 86 which prevents the spring from buckling. A by-pass 87 connects the lower end of cylinder 76 to the portion of the cylinder disposed above dashpot piston 77. This by-pass is provided with an adjustable needle valve 88 by which the rate at which a liquid, such as oil, may flow from the space below the piston to the space above the piston, or vice versa, depending upon the amount and direction of movement of the piston and the amount of liquid displaced by the displacement chamber may be varied. The displacement chamber is mounted within a pressure-tight housing 89 which is connected by a pipe 90 to sending line 41 so that the displacement chamber is always acted upon by the control impulses transmitted to the sending line.

If it be assumed that diaphragm 25 is in its normal position as shown in Fig. 3, and that the suction acting on the lower side of the diaphragm increases, then the diaphragm will move downwardly, compressing slightly spring 75, and at the same time moving valve 63 downwardly to open the inlet port 58 a predetermined amount and to throttle or close off the exhaust port 60 by the same amount, whereby the control pressure impulse delivered to sending line 41 and to housing 89 is increased. This increased pressure on displacement chamber 82 causes it to contract and to build up a pressure in the fluid acting on the underside of dashpot piston 77. This causes the piston to move upwardly and to compress spring 75 so that a force is set up which tends to return the diaphragm 25 to the position from which it was moved. As this pressure persists in the fluid, fluid is caused to pass through by-pass 87 into the space above dashpot piston 77 and thereby relieve the pressure acting on the dashpot piston. The more the liquid flows through the by-pass the more the pressure is relieved on the dashpot piston so that it is gradually returned by spring 75 towards the position from which it was moved, thereby gradually relieving the returning force exerted by this spring on diaphragm 25.

In practice, needle valve 88 is so adjusted that the effect of the dashpot on the diaphragm 25 will be completely dissipated by the time that the control impulses which are delivered to chamber 20 of valve 11 and to the fuel supply regulator 43 will have caused valve 11 to have assumed a new position corresponding to the pressure in the sending line 41 and to have caused regulator 43 to have made an adjustment in the fuel supply corresponding to the sending pressure.

If the suction between valve 11 and orifice 12 is decreasing, diaphragm 25 will move upwardly under the influence of spring 46, thereby moving valve 63 upwardly to restrict inlet port 58 and open exhaust port 60 by a proportionate amount, thereby decreasing the pressure impulse acting in sending line 41 and in the displacement chamber 82. When the diaphragm 25 moves upwardly, spring 75 is stretched slightly which tends to retard the upward movement of the diaphragm. But because of the decreased pressure acting on the displacement chamber 82, this chamber increases in volume causing oil to be displaced in such a direction as to draw the dashpot piston downwardly and further increase the spring tension tending to return the diaphragm towards normal position. While this is going on, oil starts to flow from the space above the dashpot piston to the space below it so that the force acting to draw the dashpot piston downwardly gradually diminishes and finally becomes nil, at which time the adjustments in valve 11 and the fuel supply regulator 43 will have been accomplished. At this time the diaphragm 25 will be in balance with the suction existing between valve 11 and orifice 12.

As stated previously herein, the changes in suction between valve 11 and orifice 12 are caused primarily by changes in position of the outlet damper 4 as required by the load demand on the boiler. Regulator 5 is controlled by a load responsive device 6 having a bellows 92 inclosed in a chamber 93 to which the pressure of the steam is transmitted by a pipe 94. As this pressure varies a lever 95 is rocked about a fulcrum 96 to operate a valve 40'. Lever 95 is connected to a relatively strong spring 97 which resists movement of the lever by the steam pressure acting on bellows 92. Valve 40' is like valve 40 and functions in the same manner, except that it is shown inverted in order to accommodate it to device 6. If the steam pressure in the boiler is rising, indicating that the load demand is decreasing, increasing pressure impulses are delivered to a bellows 98 which operates a pilot valve 99 that controls the movement and direction of movement of the regulator 5 and therefore the position of damper 4.

When these control pressures are increasing, the regulator moves upwardly to shift damper 4 towards its closed position. As damper 4 moves towards closed position, the suction between valve 11 and orifice 12 tends to decrease; which requires that valve 11 be moved towards its closed position an amount sufficient to restore the suction between it and orifice 12 to the substantially constant value sought to be maintained between them. If the load on the boiler increases, which is manifest by decreasing steam pressure, then lever 95 tends to turn clockwise as seen in Fig. 1 and to actuate valve 63' in such direction as to deliver decreasing pressure impulses to bellows which controls regulator 5. With decreasing pressure impulses acting on bellows 98, regulator 5 moves downwardly to shift damper 4 towards open position. As the damper moves towards open position the suction between valve 11 and orifice 12 tends to increase which requires that valve 11 be shifted to a position of greater opening so that the suction between it and the orifice may be restored to the substantially constant value sought to be maintained therebetween. To these changes in suction as effected by a change in damper position, device 13 responds to so operate valve 11 as to maintain the pressure drop across it substantially constant at a value for which diaphragm 25 is balanced and to so operate the fuel supply regulator 43 that the fuel supply will be regulated by and in accordance with the rate of air supply and in accordance with the load demand.

While a system embodying the principles of this invention have been shown and described, it will be appreciated by those skilled in this art that various modifications and changes may be made therein without departing either from the spirit or the scope of the invention. It is desired, therefore, that only such limitations shall be placed on the invention as are imposed by the prior art and the appended claims.

What I claim as new and desire to secure by Letters Patent is:

1. A control system for maintaining a predetermined relationship between a variable flowing quantity (gas, fluid, or liquid) and another variable quantity (gas, fluid, liquid or solid) comprising an auxiliary conduit through which a medium flows at a rate that varies by and in accordance with the rate of flow of one of said variable quantities, said conduit having at least two orifices therein, one of which is adjustable, a pressure sensitive member connected to respond to the pressure drop across said adjustable orifice, a pressure impulse sending device disposed for operation by said sensitive member and arranged to transmit a pressure impulse that varies in accordance with the flow through said variable orifice, means responsive to said impulse for adjusting said adjustable orifice, increasing its opening with increasing flow therethrough and decreasing its opening with decreasing flow therethrough, and means responsive to said pressure impulse for causing said another variable quantity to vary in accordance therewith.

2. In a control system for furnaces, means responsive to changes in draft for establishing a flow simulating the rate of gas weight traversing the furnace, means for developing a pressure drop in said simulating flow means, means responsive to said pressure drop for developing a control force that varies by and in accordance with said pressure drop, means responsive to said control force for controlling a constituent of combustion for said furnace, and means actuated by said control force for adjusting the pressure drop developing means to maintain a balance between said pressure responsive means and said pressure drop for each rate of flow through said flow simulating means.

3. In a control system for furnaces, means responsive to changes in draft for establishing a flow simulating the rate of gas weight traversing the furnace, means for developing a pressure drop in said simulating flow means, means responsive to said pressure drop for developing a control force that varies by and in accordance with said pressure drop, and means responsive to said control force for controlling a constituent of combustion for said furnace, characterized by the fact that the flow simulating means comprises a conduit, one end of which is connected to the outlet of the furnace and the other of which is in communication with the atmosphere, and having therein a fixed orifice and an adjustable orifice provided with an operating device, and that said pressure responsive means responds to the drop across said adjustable orifice and that its control force actuates said operating device to position the adjustable orifice in accordance therewith to maintain said pressure responsive means in balance with said drop for each rate of flow through the conduit.

ROBERT R. DONALDSON, Jr.